United States Patent
Wang et al.

(10) Patent No.: US 9,906,030 B2
(45) Date of Patent: Feb. 27, 2018

(54) OPTIMAL CONTROL METHOD FOR REACTIVE VOLTAGE OF WIND POWER AND PHOTOVOLTAIC POWER CENTRALIZED GRID CONNECTION

(71) Applicants: GANSU ELECTRIC POWER CORPORATION WIND POWER TECHNOLOGY CENTER, Lanzhou, Gansu Province (CN); STATE GRID GANSU ELETRIC POWER CORPORATION, Lanzhou, Gansu Province (CN); STATE GRID CORPORATION OF CHINA, Beijing (CN); NORTH CHINA ELECTRIC POWER UNIVERSITY, Beijing (CN)

(72) Inventors: Ningbo Wang, Lanzhou (CN); Wenying Liu, Lanzhou (CN); Dan Jin, Lanzhou (CN); Jiaming Wang, Lanzhou (CN); Yanhong Ma, Lanzhou (CN); Cai Liang, Lanzhou (CN); Long Zhao, Lanzhou (CN); Yalong Li, Lanzhou (CN); Qiang Zhou, Lanzhou (CN); Jing Wen, Lanzhou (CN); Rong Huang, Lanzhou (CN); Rundong Ge, Lanzhou (CN); Jin Li, Lanzhou (CN); Peng Xu, Lanzhou (CN)

(73) Assignees: GANSU ELECTRIC POWER CORPORATION WIND POWER TECHNOLOGY CENTER, Gansu Province (CN); STATE GRID GANSU ELECTRIC POWER CORPORATION, Gansu Province (CN); STATE GRID CORPORATION OF CHINA, Beijing (CN)

( * ) Notice: Subject to any disclaimer, the term of this patent is extended or adjusted under 35 U.S.C. 154(b) by 327 days.

(21) Appl. No.: 14/655,235

(22) PCT Filed: Apr. 18, 2014

(86) PCT No.: PCT/CN2014/000421
§ 371 (c)(1),
(2) Date: Jun. 24, 2015

(87) PCT Pub. No.: WO2014/169709
PCT Pub. Date: Oct. 23, 2014

(65) Prior Publication Data
US 2015/0357818 A1 Dec. 10, 2015

(30) Foreign Application Priority Data
Apr. 18, 2013 (CN) .......................... 2013 1 0136031

(51) Int. Cl.
H02J 3/16 (2006.01)
H02J 3/38 (2006.01)
H02J 13/00 (2006.01)

(52) U.S. Cl.
CPC .................. *H02J 3/16* (2013.01); *H02J 3/38* (2013.01); *H02J 3/383* (2013.01); *H02J 3/386* (2013.01);
(Continued)

(58) Field of Classification Search
CPC ....................................................... H02J 3/16
(Continued)

(56) References Cited

U.S. PATENT DOCUMENTS

2010/0025994 A1* 2/2010 Cardinal ............... F03D 7/0284
290/44

FOREIGN PATENT DOCUMENTS

| CN | 102570471 A | 7/2012 |
| CN | 102684207 A | 9/2012 |
| CN | 103208803 A | 7/2013 |

OTHER PUBLICATIONS

Liang, Jifeng "Research on Reactive Voltage Characteristics and Control of Grid Based on Large Scale Wind Power Concentrated Access" Jan. 15, 2013. (English translation by USPTO STIC's Translations Service Center.).*

(Continued)

*Primary Examiner* — Joseph Chang
(74) *Attorney, Agent, or Firm* — Jiwen Chen

(57) ABSTRACT

The present invention has disclosed an optimal control method for reactive voltage of wind power and photovoltaic power centralized grid connection in the field of wind power and photovoltaic power grid connection control technology, comprising: setting actuating stations used to control single wind power plant/photovoltaic power plant, setting substations used to control actuating stations and set master station used to control all the substations; master station calculates (Continued)

setting voltage reference $U_{ref}$ of each substation; adopting 3σ method to process set voltage reference $U_{ref}$ to obtain set voltage reference interval; regulating high-side voltage of substation to make it fall in set voltage reference interval; if high-side voltage of substation does not fall in set voltage reference interval, then regulating the equipment in wind power plant/photovoltaic power plant via actuating station. The present invention guides the actual operations of electric power system.

4 Claims, 5 Drawing Sheets

(52) U.S. Cl.
CPC ......... *H02J 13/0006* (2013.01); *Y02E 10/563* (2013.01); *Y02E 10/763* (2013.01); *Y02E 40/34* (2013.01); *Y02E 40/72* (2013.01); *Y02E 60/723* (2013.01); *Y02E 60/726* (2013.01); *Y04S 10/123* (2013.01); *Y04S 10/16* (2013.01); *Y04S 10/24* (2013.01); *Y10T 307/549* (2015.04)

(58) Field of Classification Search
USPC .......................................................... 307/52
See application file for complete search history.

(56) References Cited

OTHER PUBLICATIONS

Liang, Jifeng, Research on Reactive VOltage Characteristics and Control of Grid Based on Large Scale Wind Power Concentrated Access, China Master's Theses Full-Text Database, No. 1, Jan. 15, 2013, sections 2.4-2.5, chapters 3-4.

* cited by examiner

OPTIMAL CONTROL METHOD FOR REACTIVE VOLTAGE OF WIND POWER AND PHOTOVOLTAIC POWER CENTRALIZED GRID CONNECTION

This is a U.S. national stage application of PCT Application No. PCT/CN2014/000421 under 35 U.S.C. 371, filed Apr. 18, 2014 in Chinese, claiming the priority benefit of Chinese Application No. 201310136031.5, filed Apr. 18, 2013, which is hereby incorporated by reference.

TECHNICAL FIELD

The present invention belongs to the field of wind power and photovoltaic grid connection control technology, especially relates to an optimal control method for reactive voltage of wind power and photovoltaic power grid connection.

BACKGROUND TECHNOLOGY

In order to improve energy structure and strengthen environmentally-friendly construction, large-scale wind/photovoltaic power generation bases are built successively, which has formed the operating mode of wind/photovoltaic power grid connection. Cluster and scale of wind/photovoltaic power plants have accelerated the influences on the network voltage made by instability of wind/photovoltaic power, which makes voltage fluctuate frequently and brings difficulty to cohere optimal control levels of reactive voltage. Therefore, it is significant to establish an optimal control mode of reactive voltage that adapts to large-scale wind/photovoltaic power centralized grid connection.

At present, as optimal control for reactive voltage has not considered the influences on network voltage made by large-scale wind/photovoltaic power centralized grid connection, an optimal control mode for reactive voltage that adapts to large-scale wind/photovoltaic power centralized grid connection needs to be established.

SUMMARY OF THE INVENTION

In the present invention, an optimal control method for reactive voltage of wind power and photovoltaic power centralized grid connection is come up with to solve the influences on network voltage made by randomness and volatility of large-scale wind/photovoltaic power centralized grid connection to improve operating quality of network voltage.

In order to realize the above purpose, the technical solution puts forward in the present invention is an optimal control method for reactive voltage of wind power and photovoltaic power centralized grid connection characterized in the methods, comprising:

step 1: setting actuating stations used to control a single wind power plant/photovoltaic power plant at the connection point of a single wind power plant/photovoltaic power plant, setting substations used to control actuating stations at grid connection points of the wind power plant/photovoltaic power plant and setting a master station to control all these substations;

step 2: master station collecting electric power data of each wind power plant/photovoltaic power plant via substations and actuating stations and calculating set voltage reference $U_{ref}$ of each substation according to the collected data;

step 3: adopting 3σ method to process set voltage reference $U_{ref}$, then the set voltage reference interval of $[U_{ref-min}, U_{ref-max}]$ is obtained;

step 4: regulating high-side busbar voltage of substation to make it fall in the set voltage reference interval of $[U_{ref-min}, U_{ref-max}]$;

step 5: if high-side busbar voltage of substation does not fall in the set voltage reference interval of $[U_{ref-min}, U_{ref-max}]$, the equipment of wind power plant/photovoltaic power plant needs to be regulated via actuating station. Specifically, when the voltage needs to be reduced, decreasing the input of capacitive compensation equipment and/or increasing input of inductive compensation equipment; when voltage needs to be raised, increasing input of capacitive compensation equipment and/or decreasing input of inductive compensation equipment.

The Step 3 specifically refers that:

step 101: setting voltage reference $U_{ref}$ as mathematical expectation μ, namely let $μ=U_{ref}$;

Step 102: calculating reactive voltage control sensitivity S of substation, computational formula of which is $S=(J_{QV}-J_{Q\theta}J_{P\theta}^{-1}J_{PV})$, wherein, $J_{P\theta}$, $J_{PV}$, $J_{Q\theta}$ and $J_{QV}$ refer to Jacobian matrix respectively. $J_{P\theta}$ is the Jacobian matrix formed by listing the elements of $\Delta P/\Delta\theta$ together; $J_{PV}$ is the Jacobian matrix formed by listing the elements of $\Delta P/\Delta V$ together; $J_{Q\theta}$ is the Jacobian matrix formed by listing the elements of $\Delta Q/\Delta\theta$ together; $J_{QV}$ is the Jacobian matrix formed by listing the elements of $\Delta Q/\Delta V$ together. In addition, ΔP, ΔQ, Δθ and ΔV represent active micro-increment, reactive micro-increment, voltage phase-angle micro-increment and amplitude micro-increment of substation respectively;

step 103: ensuring minimum adjustable capacity $Q_{min}$, of the equipment of each substation;

step 104: calculating variance σ with formula $\sigma=\sqrt{S^{-1}Q_{min}}$ and making $[μ-3σ, μ+3σ]$ as set voltage reference interval.

For the control method provided in the present invention, the influences on optimal control for reactive voltage made by frequent fluctuations of the power supply after large-scale wind/photovoltaic power obtains access to the system have been considered, hierarchical control is adopted through entire network optimization and voltage reference value is processed with 3σ method at the same time to make optimal control mode able to adapt to frequent fluctuations of the voltage of wind/photovoltaic power plant and to increase the feasibility of implementation control, which guide the actual operations of electric power system.

Other characteristics of the present invention and advantages will be explained in the latter part of the specification, and will be obvious partially from the specification, or can be understood through implementation of the present invention. The object and other advantages of the present invention can be achieved and obtained through the structures specifically pointed in this specification, claims and drawings.

With reference to the drawings and the embodiments, the technical solution of the present invention are further explained in detail as follows.

BRIEF DESCRIPTION OF THE DRAWINGS

The drawings are provided for further understanding of the present invention. The drawings are a part of the specification and used together with the embodiments of the present invention to explain the present invention and do not constitute limitations to the present invention.

EMBODIMENTS OF THE PRESENT INVENTION

Integrating attached drawings, preferred embodiments are illustrated below. It should be noted that the following illustrations are only examples, but not to limit the protection scope of the present invention.

Embodiment 1

The optimal control method for reactive voltage of wind power and photovoltaic power centralized grid connection provided by the present invention comprises:

Step 1: setting actuating stations used to control a single wind power plant/photovoltaic power plant at the connection point of a single wind power plant/photovoltaic power plant, setting substations used to control actuating stations at grid connection points of the wind power plant/photovoltaic power plant and setting master station to control all these substations.

Figure 1:
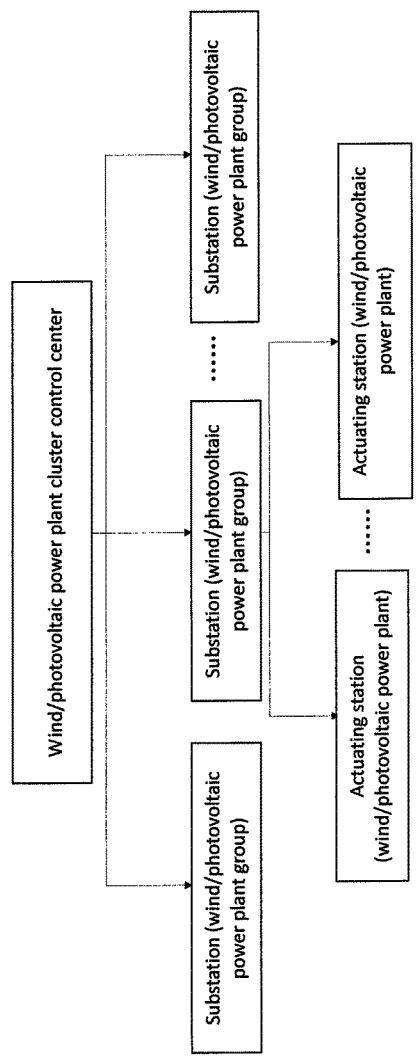
FIG. 1 is a schematic diagram for the tertiary optimal control system adapted to large-scale wind power/photovoltaic power centralized grid connection.

In the present invention, master station can be nominal to realize reactive optimization of the entire network; substations are set at grid connection points of wind/photovoltaic power plant to realize secondary voltage control; actuating stations are set at collection point of the single wind/photovoltaic power plant to realize primary voltage control. Detailed structure of the tertiary optimal control system adapted to large-scale wind/photovoltaic power centralized grid connection should refer to FIG. 1.

Step 2: master station collecting electric power data of each wind power plant/photovoltaic power plant via substations and actuating stations and calculating set voltage reference $U_{ref}$ of each substation according to the collected data.

Figure 2:
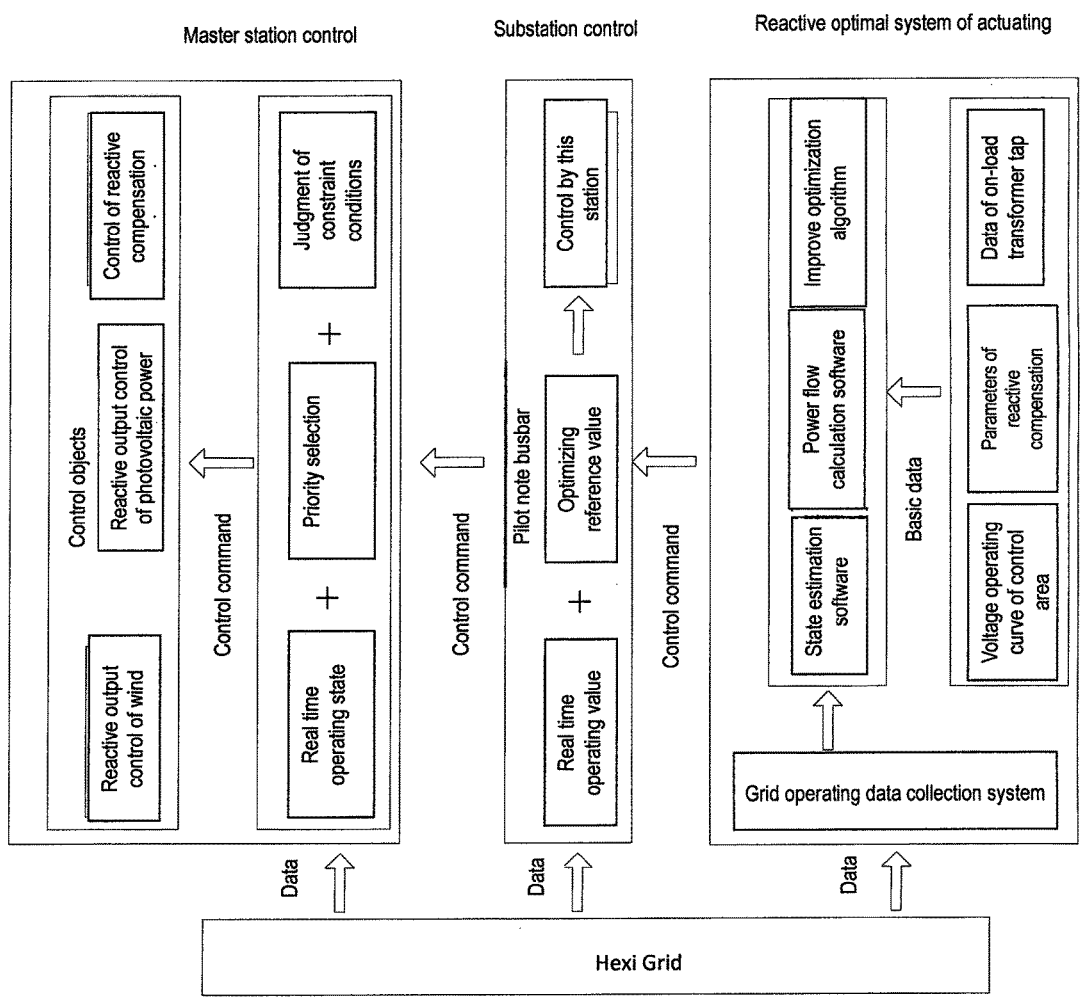
FIG. 2 is a schematic diagram for the functional structure of reactive optimization.
Figure 3:
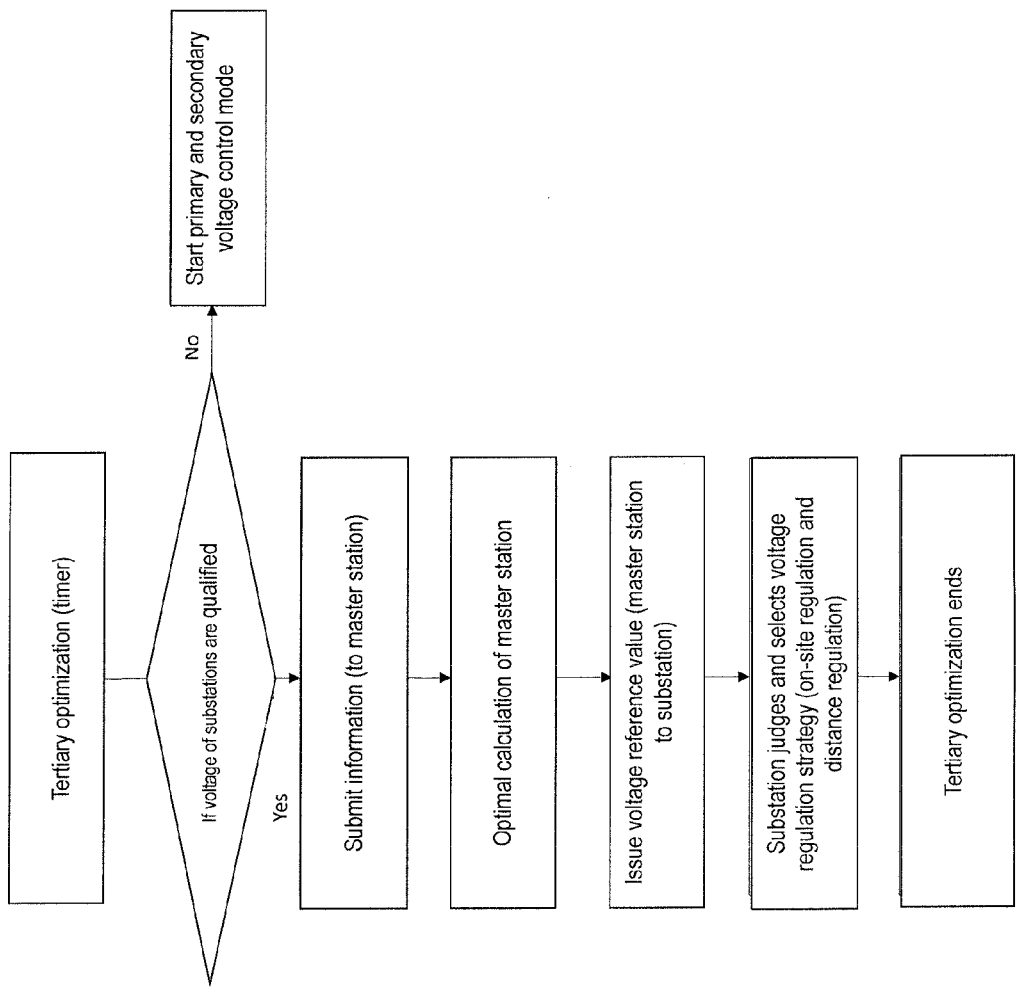
FIG. 3 is a schematic diagram for the tertiary optimal control mode of reactive voltage.

State estimation is made on the basis of MATLAB and the optimal power flow distribution targeted on minimum network loss of the entire network is calculated through improving differential evolution arithmetic, wherein, the process for master station calculates $U_{ref}$ includes power flow calculation, state estimation and optimal calculation. The real time data used in calculation are provided by SCADA system. SCADA system makes distance collection and processing on real time data of the power grid, then provides these data to power flow calculation, state estimation and optimal calculation, so as to obtain $U_{ref}$. FIG. 2 is a schematic diagram for the functional structure of reactive optimization and FIG. 3 is a schematic diagram for the tertiary optimal control mode of reactive voltage.

Step 3: adopting 3σ method to process set voltage reference $U_{ref}$, then the set voltage reference interval of $[U_{ref-min}, U_{ref-max}]$ is obtained.

First, slight voltage fluctuations are similarly considered to follow normal distribution and based on normal distribution and 3σ method, the implementation interval of [μ−3σ, μ+3σ] with confidence coefficient as 99% is obtained. In this interval, the voltage fluctuation is considered to be slight, so that it does not need to be optimized and adjusted, and it needs to be optimized and adjusted only when it exceeds this interval.

Specific process for the processing set voltage reference $U_{ref}$ with 3σ method refers to:

step 101: setting voltage reference $U_{ref}$ as mathematical expectation μ, namely let μ=$U_{ref}$;

step 102: calculating reactive voltage control sensitivity S of substation with the formula $$S = (J_{QV} - J_{Q\theta} J_{P\theta}^{-1} J_{PV}) \quad (1)$$

wherein, $$\begin{bmatrix} \Delta P \\ \Delta Q \end{bmatrix} = \begin{bmatrix} J_{P\theta} & J_{PV} \\ J_{Q\theta} & J_{QV} \end{bmatrix} \begin{bmatrix} \Delta \theta \\ \Delta V \end{bmatrix} \quad (2)$$

$$\Delta Q = (J_{QV} - J_{Q\theta} J_{Q\theta}^{-1} J_{PV}) \Delta V \quad (3)$$

In formula (1), (2) and (3), $J_{P\theta}$, $J_{PV}$, $J_{Q\theta}$ and $J_{QV}$ refer to different Jacobian matrixes respectively. $J_{P\theta}$ is the Jacobian matrix formed by listing the elements of ΔP/Δθ together; $J_{PV}$ is the Jacobian matrix formed by listing the elements of ΔP/ΔV together; $J_{Q\theta}$ is the Jacobian matrix formed by listing the elements of ΔQ/Δθ together; $J_{QV}$ is the Jacobian matrix formed by listing the elements of ΔQ/ΔV together. In addition, ΔP, ΔQ, Δθ and ΔV represent active micro-increment, reactive micro-increment, phase-angle micro-increment of voltage and amplitude micro-increment of substation respectively. Elements of Jacobian matrix are decided by network structure, which can be obtained via node voltage method when network parameters of specific grid like reactance and topological structure are given.

step 103: determining minimum adjustable capacity $Q_{min}$ of the equipment of each substation.

In an actual grid, each substation is equipped with different reactive compensation equipment, among which the equipment like capacitor and reactor are adjusted in steps, including fixed capacity and adjustable capacity. $Q_{min}$ refers to minimum adjustable capacity of an equipment in some substation. Master station can call up detailed information of reactive compensation equipment in each substation with SCADA system software, so as to obtain $Q_{min}$ value.

step 104: calculating variance σ with formula σ=$\sqrt{S^{-1} Q_{min}}$ and making [μ−3σ, μ+3σ] as set voltage reference interval.

In step 3, in a normal distribution with as μ the mathematical expectation and a as the standard error, the chance of the probability density function satisfying normal distribution and falling with an interval with μ as the center and 3σ of the interval length is 99.7%. Thus, such method of using the interval where μ is the center and 3σ is the interval length to approximately represent the probability density of the complete normal distribution function is called 3σ method. In this application, it is deemed that the voltage operation fluctuation satisfies the normal distribution using 6 as the standard error. Thus, the chance of the operating voltage falls within the interval is higher than 99.7%, and this interval can be used as interval for the voltage reference value to replace the voltage reference value;

In step 3, when the voltage needs to be reduced, decreasing input of capacitive compensation equipment and/or increasing input of inductive compensation equipment; when voltage needs to be raised, increasing input of capacitive compensation equipment and/or decreasing input of inductive compensation equipment;

wherein standard to judge the voltage is whether the voltage of the substations falls within the interval [μ−3σ,μ+3σ], if the voltage falls within the interval, no adjustment is needed; otherwise when the substations voltage is higher than μ+3σ, the voltage needs to be reduced, the substations voltage is lower than μ−3σ, the voltage needs to be raised.

Step 4: regulating high-side busbar voltage of substation to make it fall in the set voltage reference interval of [$U_{ref\text{-}min}, U_{ref\text{-}max}$];

On-site regulation is adopted in substations, which can be diversified. One of these regulations refers to select the order for equipment to take actions according to response time of reactive compensation equipment and regulating objects are reactive compensation equipment, such as SVG (static var generator), SVC (static var compensator), capacitor, resistor, etc.

Substation regulation is a continuous loop and discontinuity points can be set between, namely if voltage is qualified (namely high-side voltage of substation falls in [$U_{ref\text{-}min}, U_{ref\text{-}max}$]) or regulated volume of reactive compensation equipment is used up, regulation stops.

In step 4, the voltage of the substations is adjusted through adjusting var compensation equipment of the substations. The specific process to adjust the substation voltage can be done according to the adjustment strategy of substation var compensation equipment. The strategy can be made according to the actual conditions with various possible types. For example, making a substation adjustment strategy according to the fast or slow action time of the var compensation equipment is firstly adjusting SVC, then adjusting capacitor, resistor, and finally adjusting the tap of the transformer;

Step 5: if high-side busbar voltage of substation does not fall in the set voltage reference interval of [$U_{ref\text{-}min}, U_{ref\text{-}max}$], the equipment of wind power plant/photovoltaic power plant needs to be regulated via actuating station. Specifically, when the voltage needs to be reduced, decreasing input of capacitive compensation equipment and/or increase input of inductive compensation equipment; when voltage needs to be raised, increasing input of capacitive compensation equipment and/or decrease input of inductive compensation equipment.

When all the regulating measures have been used up but the voltage still exceeds [$U_{ref\text{-}min}, U_{ref\text{-}max}$], substation will issue an order to actuating station to proceed with primary voltage regulation. Regulation equipment includes capacitor, resistor, SVC/SVG and auto-regulation system of wind/photovoltaic power generator. All of the capacitor, resistor, SVC/SVG and auto-regulation system of wind/photovoltaic power generator have the control interfaces used to receive orders. After one of them receives the regulating order (target voltage value), the voltage can be regulated according to the high-side voltage of substation. Specifically, when the actual voltage is higher than target voltage, decreasing the input of capacitive compensation equipment or increasing the input of inductive compensation equipment, or vice versa. When the difference between actual voltage and target voltage is regulated to be less than set threshold value, it meets the requirement. Then it can stop regulating or until capacity of regulating equipment is used up.

Embodiment 2

Figure 4:
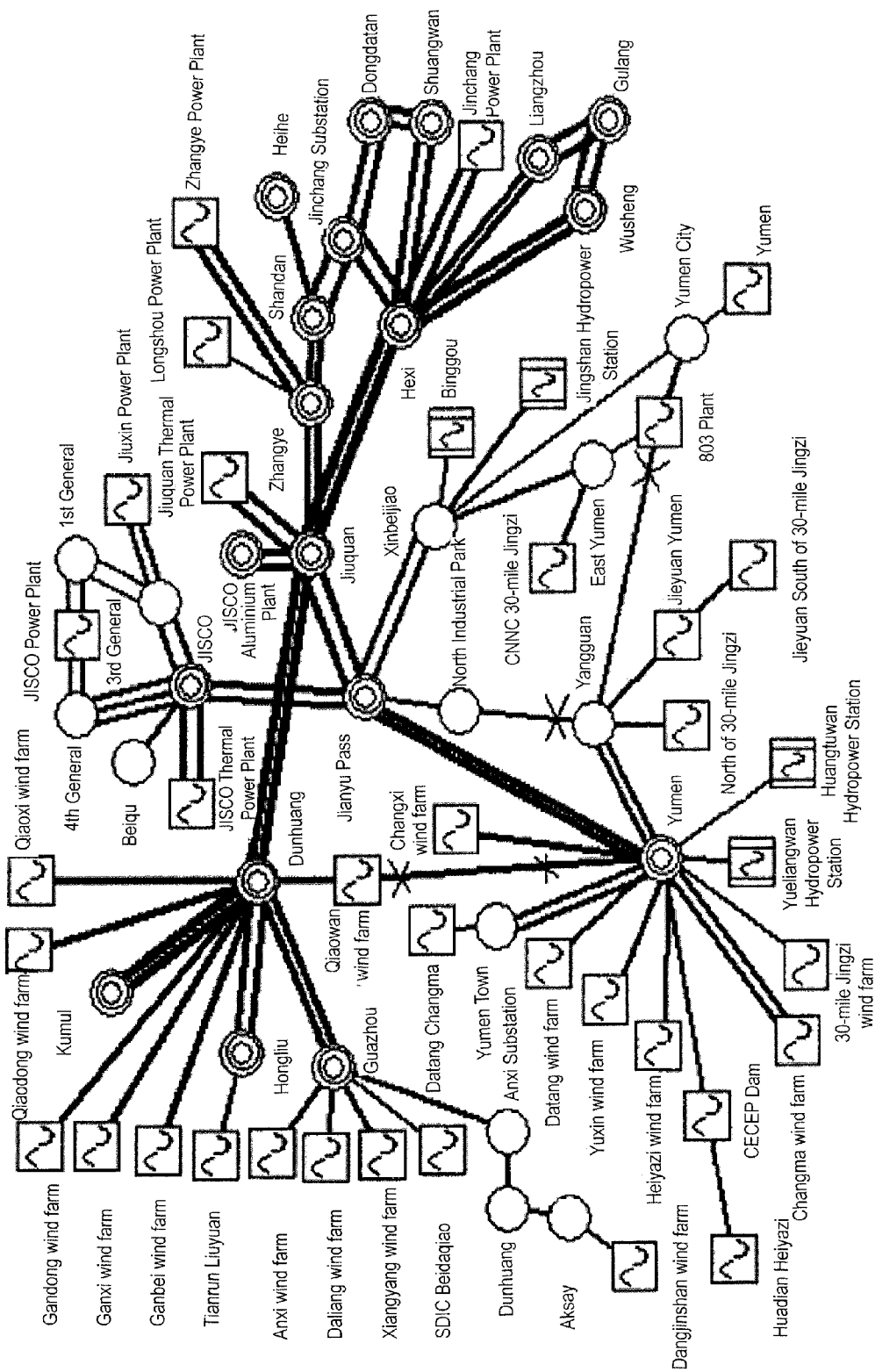
FIG. 4 is a schematic diagram for an electric power system including large-scale wind/photovoltaic power base.
Figure 5:
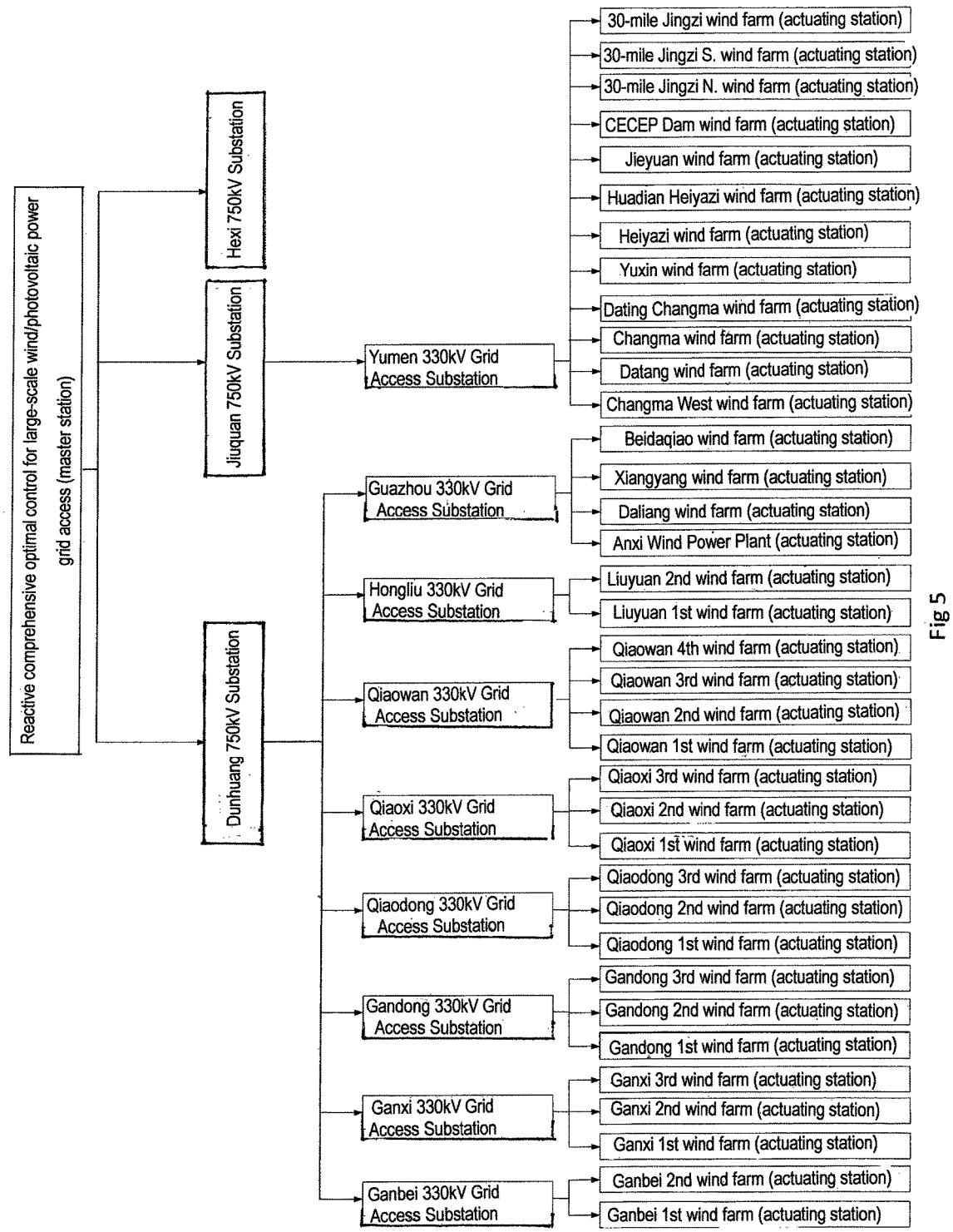
FIG. 5 is a schematic diagram for a tertiary reactive voltage control including large-scale wind/photovoltaic power base.

FIG. 4 is a schematic diagram for an electric power system including large-scale wind/photovoltaic power bases. Using this as an example, the optimal control method for reactive voltage provided in the present invention includes:

Step 1: establishing tertiary reactive optimal control system according to the actual grid structure in FIG. 4, as it is shown in FIG. 5.

Step 2: conducting reactive optimal calculation of the entire network. Making state estimation, power flow calculation and optimal calculation at reactive comprehensive optimal control master station of large-scale wind/photovoltaic power grid connection to obtain voltage regulating references for 9 substations as $U_{ref1}$-$U_{ref9}$.

Step 3: processing $U_{ref}$ with 3σ method. Based on the results of power flow calculation in Step 2, calculating reactive voltage sensitivity coefficient $S_1$-$S_9$ of the 9 substations and then calculating minimum adjustable reactive compensation equipment $Q_{min1}$-$Q_{min9}$ of each substation, so as to obtain $\sigma_1$-$\sigma_9$. Finally, voltage regulating interval [$U_{ref\text{-}min}, U_{ref\text{-}max}$] of each of the 9 substations can be obtained.

Step 4: secondary voltage regulation, with set reference interval as regulating target. When substation voltage exceeds [$U_{ref\text{-}min}, U_{ref\text{-}max}$], making substation regulation, until the voltage meets this interval, wherein, substation voltage refers to high-side voltage of substation.

Step 5: primary voltage regulation. After regulating measures are used up and the voltage still exceeds [$U_{ref\text{-}min}, U_{ref\text{-}max}$], substation will issue orders to actuating station to make primary voltage regulation, namely actuating station regulates the equipment. Regulating equipment includes capacitor, resistor, SVC/SVG and auto-regulation system of wind/photovoltaic power generator.

Pursuant to the above methods, calculation and analysis are made on the embodiment shown in FIG. 4 and the results are illustrated in Table 1 and Table 2.

TABLE 1

Voltage Reference Results of Reactive Optimal Substation

| | Substation | | | | | | | | |
|---|---|---|---|---|---|---|---|---|---|
| Parameter | Ganbei | Ganxi | Gandong | Qiaobei | Qiaowan | Qiaoxi | Hongliu | Yumen | Guazhou |
| $U_{ref}$ | 354 | 356 | 357 | 355 | 357 | 352 | 356 | 352 | 357 |
| $U_{refmin}$ | 352 | 353 | 355 | 354 | 355 | 351 | 353 | 350 | 355 |
| $U_{refmax}$ | 356 | 359 | 359 | 356 | 359 | 353 | 359 | 354 | 359 |

TABLE 2

Statistical Results for Action Times/Days of Reactive Compensation Equipment of Voltage Regulating Substation

| Regulating times | Substation | | | | | | | | |
|---|---|---|---|---|---|---|---|---|---|
| | Ganbei | Ganxi | Gandong | Qiaobei | Qiaowan | Qiaoxi | Hongliu | Yumen | Guazhou |
| Regulate $U_{ref}$ | >10 | >10 | >10 | >10 | >10 | >10 | >10 | >10 | >10 |
| Regulate [$U_{ref-min}$, $U_{ref-max}$] | 3 | 2 | 2 | 4 | 2 | 1 | 3 | 2 | 2 |

The above case study indicates that: having overcome the problem of traditional reactive optimal control mode that voltage regulating reference value is fixed, this method adapts to frequent fluctuations of system voltage when large-scale wind/photovoltaic power obtains access to grid, and while considering regulating effect, action times for reactive compensation equipment are also reduced, which guides optimal operation when large-scale wind/photovoltaic power obtains access to grid.

Finally, what is said above are only preferred embodiments of the present invention, but protection scope of the present invention is not confined to these embodiments. A person of ordinary skills in the art in technical field may modify the technical solution of the present invention or substitute a part of the technical solution for an equivalent feature. As long as they are within the spirit and principle of the present invention, any changes, equivalent substitution or improvements are within the protection scope of the present invention.

The invention claimed is:

1. An optimal control method for centralized grid connection of wind power and photovoltaic power characterized in that the method comprises:

step 1: setting actuating stations to control a single wind power plant and a single photovoltaic power plant at a connection point of the wind power plant and the photovoltaic power plant, setting substations to control actuating stations at grid connection points of the wind power plant and the photovoltaic power plant and setting a master station to control all the substations;

step 2: master station collecting electric power data of each wind power plant/photovoltaic power plant via the substations and the actuating stations and calculating a set voltage reference $U_{ref}$ of each substation according to the collected data;

step 3: processing set voltage reference $U_{ref}$ by using three standard deviation method, then obtaining set voltage reference interval of [$U_{ref-min}$, $U_{ref-max}$];

step 4: regulating a high-side busbar voltage of the substation to make it fall in the set voltage reference interval of [$U_{ref-min}$, $U_{ref-max}$];

step 5: if the high-side busbar voltage of the substation does not fall in the set voltage reference interval of [$U_{ref-min}$, $U_{ref-max}$], regulating equipment of the wind power plant/photovoltaic power plant via the actuating station.

2. The optimal control method according to claim 1 characterized in that the step 3 comprises:

step 101: setting the voltage reference $U_{ref}$ as mathematical expectation $\mu$, namely letting $\mu=U_{ref}$;

step 102: calculating reactive voltage control sensitivity S of the substation, computational formula of which being $S=(J_{QV}-J_{Q\theta}J_{P\theta}^{-1}J_{PV})$, wherein, $J_{P\theta}$, $J_{PV}$, $J_{Q\theta}$ and $J_{QV}$ refer to Jacobian matrix respectively; $J_{P\theta}$ is the Jacobian matrix formed by listing the elements of $\Delta P/\Delta\theta$ together; $J_{PV}$ is the Jacobian matrix formed by listing the elements of $\Delta P/\Delta V$ together; $J_{Q\theta}$ is the Jacobian matrix formed by listing the elements of $\Delta Q/\Delta\theta$ together; $J_{QV}$ is the Jacobian matrix formed by listing the elements of $\Delta Q/\Delta V$ together; $\Delta P$, $\Delta Q$, $\Delta\theta$ and $\Delta V$ represent active micro-increment, reactive micro-increment, voltage phase-angle micro-increment and amplitude micro-increment of the substation respectively;

step 103: determining minimum adjustable capacity $Q_{min}$ of the equipment of each substation;

step 104: calculating variance $\sigma$ with formula $\sigma=\sqrt{S^{-1}Q_{min}}$ and making [$\mu-3\sigma, \mu+3\sigma$] as the set voltage reference interval.

3. The optimal control method according to claim 1 characterized in that the step 3 comprises:

when the voltage needs to be reduced, decreasing input of capacitive compensation equipment and/or increasing input of inductive compensation equipment;

when voltage needs to be raised, increasing input of capacitive compensation equipment and/or decreasing input of inductive compensation equipment;

wherein standard to judge the voltage is whether the voltage of the substations falls within the interval [$\mu-3\sigma, \mu+3\sigma$], if the voltage falls within the interval, no adjustment is needed; otherwise when the substations voltage is higher than $\mu+3\sigma$, the voltage needs to be reduced, the substations voltage is lower than $\mu-3\sigma$, the voltage needs to be raised.

4. The optimal control method according to claim 2 characterized in that the step 3 comprises:

when the voltage needs to be reduced, decreasing input of capacitive compensation equipment and/or increasing input of inductive compensation equipment;

when voltage needs to be raised, increasing input of capacitive compensation equipment and/or decreasing input of inductive compensation equipment;

wherein standard to judge the voltage is whether the voltage of the substations falls within the interval [$\mu-3\sigma, \mu+3\sigma$], if the voltage falls within the interval, no adjustment is needed; otherwise when the substations voltage is higher than $\mu+3\sigma$, the voltage needs to be reduced, the substations voltage is lower than $\mu-3\sigma$, the voltage needs to be raised.

* * * * *